UNITED STATES PATENT OFFICE.

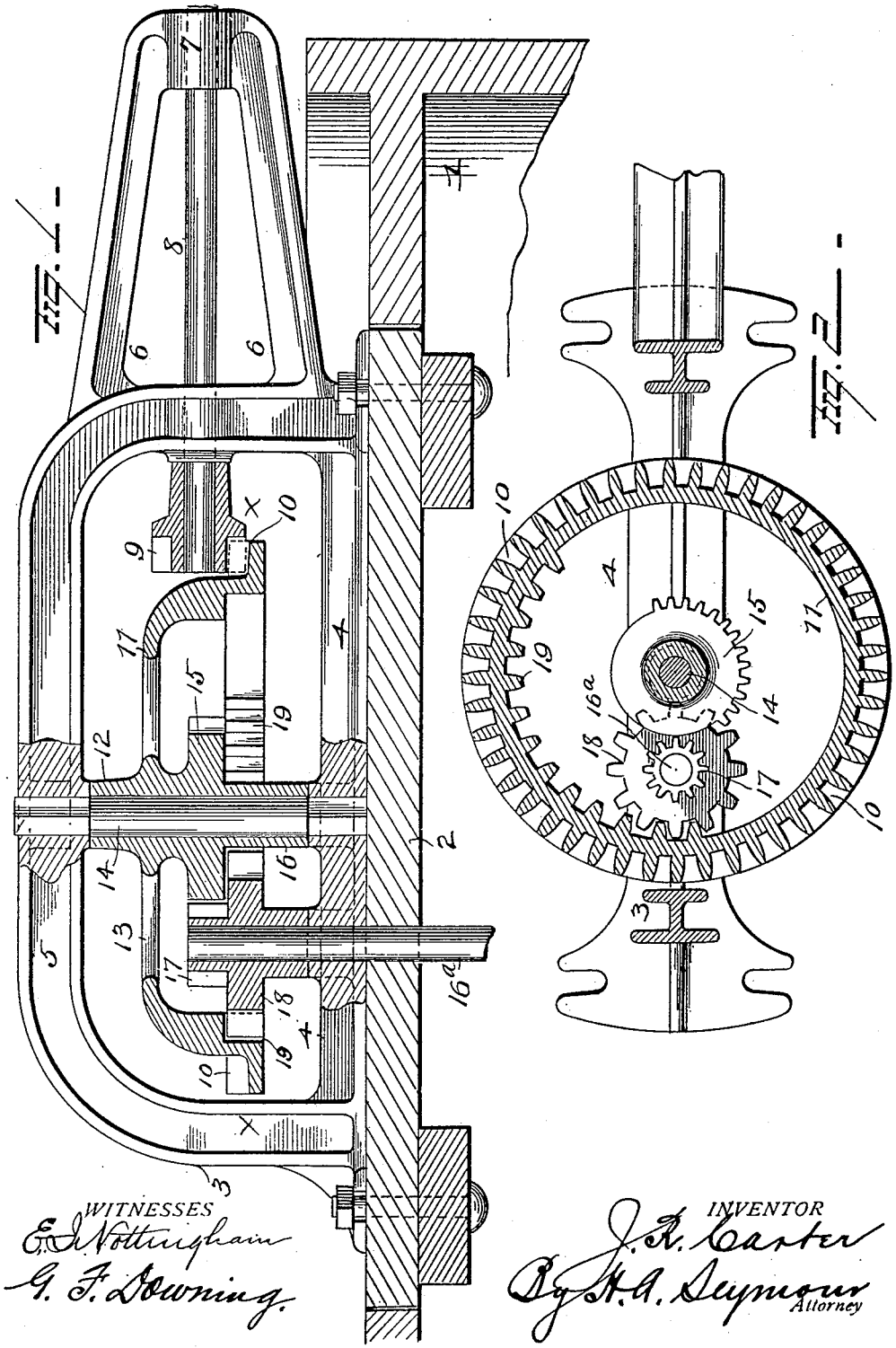

JOHN R. CARTER, OF AUGUSTA, KENTUCKY, ASSIGNOR TO ERNST H. HUENEFELD, OF CINCINNATI, OHIO.

GEARING.

SPECIFICATION forming part of Letters Patent No. 721,149, dated February 24, 1903.

Application filed October 29, 1901. Serial No. 80,427. (No model.)

*To all whom it may concern:*

Be it known that I, JOHN R. CARTER, of Augusta, in the county of Bracken and State of Kentucky, have invented certain new and useful Improvements in Gearing; and I do hereby declare the following to be a full, clear, and exact description of the invention, such as will enable others skilled in the art to which it appertains to make and use the same.

My invention relates to an improvement in gearing, and more particularly to an improved gearing for washing-machines, churns, and the like, the object of the invention being to provide a simple and efficient arrangement and construction of gears to alternately rotate a driven shaft in opposite directions by means of a drive-gear rotated continuously in either direction.

With this object in view the invention consists in certain novel features of construction and combinations and arrangements of parts, as will be more fully hereinafter described, and pointed out in the claims.

In the accompanying drawings, Figure 1 is a view in elevation, partly in section, illustrating my improvements; and Fig. 2 is a view in section on the line $x\ x$ of Fig. 1.

1 represents the body of a washing-machine or churn, as the case may be, having the lid or cover 2, on which is secured a metal frame 3. The frame 3 comprises a base 4, secured to the lid by any approved means and having an arched bracket 5, from one side of which outwardly-projecting and integral arms 6 are provided and converge to an integral bearing 7, alining with a bearing in bracket 5 to support the drive-shaft 8, driven by any desired means. On the end of drive-shaft 8 which projects into frame 3 a gear-wheel 9 is secured and meshes with a circular rack or series of teeth 10 on an outwardly-projecting flange at the periphery of a horizontally-disposed wheel 11, having a central hub or bearing 12, connected to the wheel proper by an integral spider 14. This hub or bearing is mounted on a vertical shaft 14, supported in suitable bearings in bracket 6 and base 4 and projects down below the spider 13 and is made with an integral mutilated or segmental gear 15, for a purpose which will hereinafter appear, and a sleeve 16 is preferably mounted on shaft 14 below gear 15 to assist in supporting the wheel 11.

The dasher rod or shaft $16^a$, on which may be secured, in body 1, a dasher of any desired construction, projects up through base 4 and has secured thereon double integral gears 17 and 18, the former or upper gear being of appreciably smaller diameter than the lower gear 18 and adapted to mesh with the segmental gear 15 and be driven thereby in one direction, and the other or lower gear 18 meshes intermittingly with an internal mutilated or segmental gear 19 on the wheel 11 to drive this gear in the opposite direction.

The operation of my improvements is as follows: The drive-shaft 8 is turned in either direction, thus turning gear-wheel 9 and transmitting motion to wheel 11 by means of rack or gear teeth 10 to rotate the wheel and the integral gear 15 continuously in either direction. The teeth of the segmental gears 15 and 19 are disposed directly opposite to each other, so that when the segmental gear 15 engages gear 17 to revolve dasher-rod $16^a$ in one direction the segmental gear-teeth 19 are out of engagement with gear 18, and as soon as the segmental gear 15 turns far enough to free itself from gear 17 the segmental gear 19 will engage the gear 18 and drive the dasher-rod in the reverse direction. Thus the segmental gears 15 and 19 will alternately engage the integral or double gears 17 18 to drive the dasher-rod in reverse direction.

It will be readily understood that by making the gear 17 the same relative size to gear 15 that gear 18 is to gear 19 the speed and distance of rotation of the dasher-rod can be made approximately the same in both directions.

Various slight changes might be made in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a driven shaft and gearing fixed thereto, of a circular casting having a continuous annular engaging face and provided with two segments spaced apart, said segments disposed to successively engage the gearing on the driven shaft, a driving-shaft and a gear on the driving-shaft in constant engagement with the continuous engaging surface of the casting.

2. The combination with a frame and an arm projecting laterally therefrom, of a wheel mounted horizontally in said frame and having a continuous toothed periphery, said wheel provided therein with two toothed segments, a driving-shaft mounted in the frame and lateral arm, a pinion secured to said shaft and engaging the continuous toothed periphery of the wheel, a driven shaft extending into said wheel and gearing on the driven shaft to be alternately engaged by said segments.

In testimony whereof I have signed this specification in the presence of two subscribing witnesses.

JOHN R. CARTER.

Witnesses:
S. W. FOSTER,
R. S. FERGUSON.